United States Patent [19]

Shy

[11] 4,300,705
[45] Nov. 17, 1981

[54] VACUUM INSULATED BOTTLE WITH MECHANISM FOR DISPENSING LIQUID BY COMPRESSION

[76] Inventor: Min C. Shy, 20, Alley 18, Lane 109, Hoping St., Yang Ho City, Taipei Hsien, Taiwan

[21] Appl. No.: 148,102

[22] Filed: May 9, 1980

[51] Int. Cl.³ ............................................. B67D 5/42
[52] U.S. Cl. .................................... 222/131; 222/207; 222/383
[58] Field of Search ............... 222/131, 207, 209, 383, 222/385, 401, 380

[56] References Cited

U.S. PATENT DOCUMENTS

| | | | |
|---|---|---|---|
| 1,929,564 | 10/1933 | Rolph | 222/401 X |
| 2,853,210 | 9/1958 | Stewart et al. | 222/481 X |
| 3,162,333 | 12/1964 | Davidson | 222/207 |
| 3,905,520 | 9/1975 | Nishika | 222/209 |
| 4,174,053 | 11/1979 | Shimizu | 222/383 X |
| 4,238,054 | 12/1980 | Chen | 222/209 X |

Primary Examiner—David A. Scherbel
Attorney, Agent, or Firm—Karl W. Flocks

[57] ABSTRACT

The present invention is to provide a kind of vacuum insulated bottle with device able to drain off water by compression, more particularly, to provide a compressed vacuum insulated bottle operating by functions of siphonage and compression of the elastic pouch set on the top of bottle stopper to siphon boiling water from the inner bottle into the elastic pouch and then to drain off boiling water by compression.

4 Claims, 6 Drawing Figures

VACUUM INSULATED BOTTLE WITH MECHANISM FOR DISPENSING LIQUID BY COMPRESSION

SUMMARY OF THE INVENTION

The present invention relates to a thermos bottle with device able to drain off water by compression, particularly, to a compressed vacuum insulated bottle which operates by siphoning boiling water from inner bottle and then draining off.

The oldest fashioned thermos bottle is known as the hand-carried vacuum insulated bottle. When used, the user should take fully up the bottle and then have boiling water in the bottle poured out, in such a condition that makes users feel heavy and inconvenient, especially to the old men and young children that operating the hand-carried vacuum insulated bottle is somewhat difficult; therefore this type of vacuum insulated bottle has been phased out. Following the hand-carried vacuum insulated bottle, the most common types at present are the electric thermos bottle and the air compressed vacuum insulated bottle. The electric vacuum insulated bottle is also out of ideal by virtue of complicated members, high cost, and easy out of order. As for the air compressed vacuum insulated bottle, it operates by means of the elastical pouch to compress air into inner bottle, due to air pressure compressing on liquid surface, to make boiling water been drained off through conduct pipe. The superiority of the air compressed vacuum insulated bottle is that when the bottle (inner bottle) is fully filled of liquid, the air exhausted from the elastic pouch into inner bottle will immediately reach to and pressure on the liquid surface by reason of liquid level close to bottle mouth, so that liquid in the bottle may be quickly drained off in a great amount through conduct pipe. However, if liquid in inner bottle is more less than above said level, there will be a wide space and long distance between liquid in the inner bottle and bottle mouth, and each pressing the air exhausted from the elastic pouch into inner bottle will be limited in amount, so that air pressure on the bottle's liquid will be decreasing following the liquid level down and each pressing the exhausted liquid through conduct pipe will be also decreasing. Therefore, in the conventional air compressed vacuum insulated bottle, liquid within bottle can not be sent out in a fixed amount. If the bottle holds only a small amount of water, the operation of draining water will get more difficult.

Furthermore, the general conventional air compressed vacuum insulated bottle can't contain ice cubes due to smaller bottle mouth of inner bottle. Suppose to revise the narrow-mouth inner bottle into widemouth bottle, when encountering the condition that the ice cubes are higher than the liquid level in the bottle, the compressed air can pressure only on ice cubes and can't reach liquid, the bottle will lose the compressed function of draining liquid.

The primary object of the present invention is an improvement over the conventional vacuum insulated bottle in usage and to provide a kind of vacuum insulated bottle with device able to drain off water by compression which has novel and simple construction and some improved achievements.

DETAILED DESCRIPTION

Figure 1:
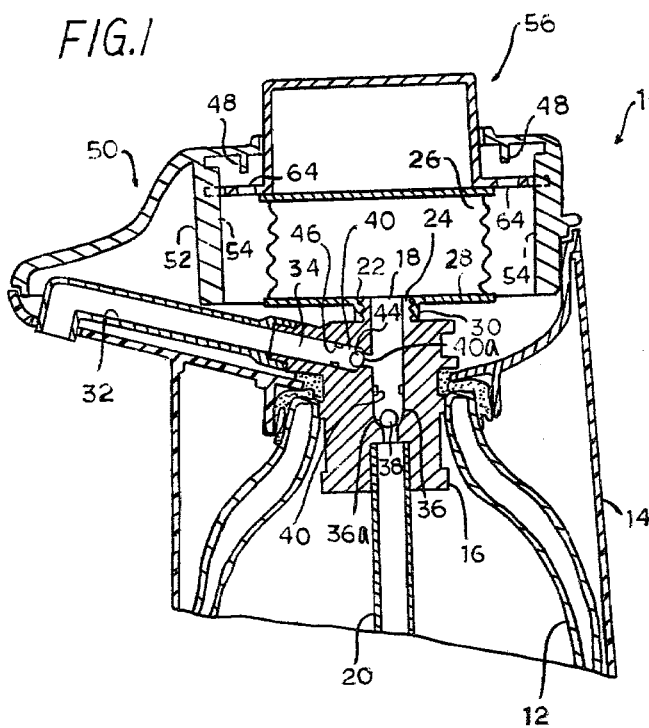
FIG. 1 is a sectional view showing the main part of the present invention, a vacuum insulated bottle with device able to drain off water by compression.

Referring the vacuum insulated bottle 10 shown in FIG. 1, the number 12 indicates an inner bottle having the function of preventing heat from loss which is set within the bottle body 14. The inner bottle 12 has double layers made from refection glass between those leaves a space in vacuum. The number 16 indicates a bottle stopper which corks the outlet of the inner bottle 12. The bottle stopper 16 includes a central duct 18 and a sloping upward forked pipe 34 which is branched out from said central duct 18 and joints with a outlet tube 32 at its end. The central duct 18 joints at its end with a suction pipe 20 deepened into inside of the inner bottle 12 and extends upward from its upper end to be a extended section 24 with screw threads 22 for screwing together with the open extension 30 extended from the hard plastic bottom base 28 of the elastic pouch 26.

In the plane next to the upper end of the suction pipe 20, the above mentioned central duct 18 is schemed to be a funnel-shaped valve 36 at which a steel ball 38 is provided, and at the normal times the steel ball 38 slips down to block the valve seat 36a due to its self-weight. At the proper position above the valve 36a, two symmetrical stop plates 42 are provided for stopping the steel ball 38 from exceeding beyond the scale limit. Furthermore, the aforesaid forked pipe 34 is also set with a valve base 40 at its lower end at which a steel ball 44 is also provided. Also, the steel ball 44 susally slips down to block the valve seat 40a due to its self-weight. At the proper position above the valve base 40, two symmetrical stop plates 46 are provided for stopping the steel ball 44 from exceeding beyond the scale limit.

Figure 2:
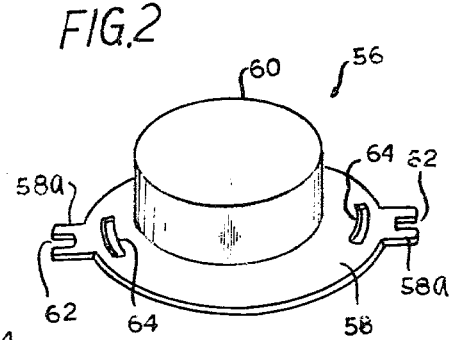
FIG. 2 is a perspective view of the pressed member taken from FIG. 1.

Stil referring FIG. 1, the said bottle body 14 is set with a lid 50 on the top side, able to be lifted and closed in users' will, which is provided with two symmetrical projected shafts 48 on its bottom side and extends downward forming a central spaced cylindrical case 52. In the inner wall of the cylindrical case 52, two projected bars 54 are symmetrical in longitudinal parallel. And the said lid 50 is much the same as the lid of the conventional air compressed vacuum insulated bottle comparing in the shape and comes into space in central upper side, within which an activator and pressed member 56 is set. The pressed member 56 as shown in FIG. 2 comprises a base 58 provided within said lid 50 and a pressed portion 60 extended out from the base 58. The lateral flanges 58a of the base 58 are schemed with two grooves 62 for fitting with the said two symmetrical projected bars 54 on the inner wall of the sylindrical case 52. Also, the base 58 is schemed with two arch slotted holes 64 for fitting with two symmetrical projected shafts 48 on the bottom side of the lid 50. In such a construction as above described, the pressed member 56 may move up and down along fixed orbit by means of the engagement between the grooves 62 provided on the lateral flanges 58a of base 58 and the projected bars 54 on the inner wall of the cylindrical case 52. Upon the base 58 moving upward to the top of the projected bar 54, the slotted holes 64 will be inserted by the projected shafts 48 provided on the bottom side of the lid 50. Therefore, the pressed member 56 may be rotated without obstacle to a certain degree indicating from the turning angle on the slotted hole 64, so the lateral flange 58a of the base 58 will leave from the engaged position with the projected bar 54. At this time, the pressed member 56 is in locked condition and Can't be pressed down because the lateral flanges 58a of the base 58 are resisted by the projected bars 54, while desirous to have the pressed member 56 opened, the pressed member 56 should be counter-rotated to a certain degree as much as above, indicating from the turning angle on the slotted hole 64, to adjust the grooves 62 provided on the lateral flanges 58a to the projected bars 54, then the pressed member 56 will be able to be pressed down.

When the first time to use the vacuum insulated bottle after the inner bottle 12 filling of boiling water, it is required to open the pressed member 56 first and then to press the pressed member 56 down to depress the elastic pouch 26 provided under the base's bottom of the pressed member 56 in shrinkage, so air original within the pouch 26 will be exhausted into the central duct 18 of the bottle stopper 16. At this time, the steel ball 38, at the valve base 36 at bottom side of the central duct 18, will be compressed under the air pressure to tightly block the valve 36a. Therefore, the air, exhausted from the pouch 26, within the central duct 18 will flow into the forked pipe 34 and push the steel ball 44, at the valve 40a of the forked pipe 34, away from its blocked position to flow out from the outlet tube 32 through vacant space between the steel ball 44 and the stop plates 46 which is provided on the inner wall of the valve base 40. While the pressing force on the pressed member 56 disappearing, the elastic pouch 26 under the function of elastical restitutive force will automatically release to push against the pressed member 56 back to its original position, and then the steel ball 44 in the valve base 40 will slip down to block the valve 40a because of disappearing of the air pressure from the central duct 18. Following above result, in the inner space of the central duct 18 will produce a suction lift to suck the steel ball 38, which originally blocks the valve 36a, and also produce a suction effect to pump or suck boiling water from the inner bottle 12 into elastic pouch 26 until the elastic pouch 26 restores to its original. If the pressed member 56 is pressed down again, the elastic pouch 26 will be depressed in shrinkage to drain boiling water from the said pouch 26 into the central duct 18 of the bottle stopper 16. As above described principle, boiling water will continue to be drained off the outlet tube 32 from the central duct 18 through the forked pipe 34. However, after boiling water in the pouch 26 has been drained off, the pouch 26 will continue to siphone boiling water from the inner bottle 12 by means of the function of restitutive force. As the operation procedure is all the same, it may press and drain off boiling water by keeping on operation to repeat the process again and again.

In order to prevent heat of boiling water kept in the pouch 26 from loss, the upper and bottom base of the elastic pouch 26 and the sylindrical case 52 may be made from heat-keeping plastics or other heatkeeping materials. If necessary, a spring may be provided in the pouch 26 for the purpose of strengthening the elastic restitutive force of the elastic pouch 26.

FIGS. 3–6 are other embodiments of the invention of the vacuum insulated bottle with device able to and dispense water by compression, in which member and installations are much the same as above described, and thus the same member is marked by the same number. The operating manner and principle are also all the same as above described example, so would not explain and state herein again.

Figure 3:
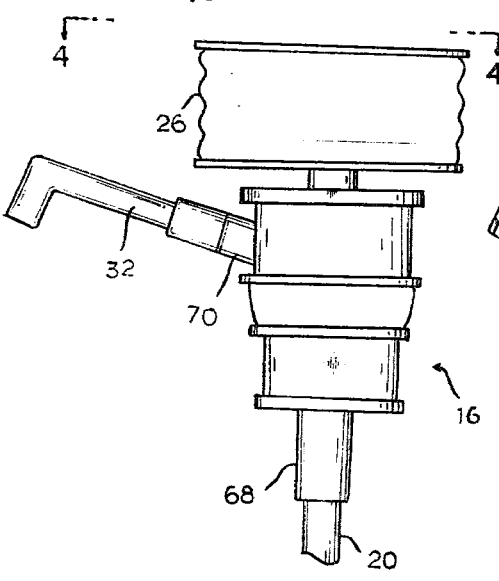
FIG. 3 is a partial plane view of another embodiment of the invention.
Figure 4:
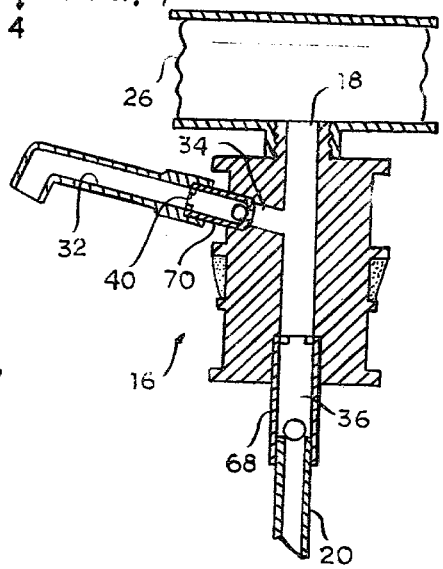
FIG. 4 is a sectional view taken along the line 4—4 of FIG. 3.

FIG. 3 and FIG. 4 show another practical example of this invention the vacuum insulated bottle with device able to drain off water by compression, in which the difference of the members and installation between this embodiment and above mentioned embodiment is that the lower end of the central duct 18 and the end of the forked pipe 34 in this embodiment are respectively provided with a first connector 68 and second connector 70. Those two connectors 68, 70 have the same structure and function as the valve bases 36, 40 in the above descrived practical example. The first connector 68 further connects to a suction pipe 20 at its lower end, and the second connector 70 connects to a suction pipe 32 at its end shown in FIG. 4.

Figure 5:
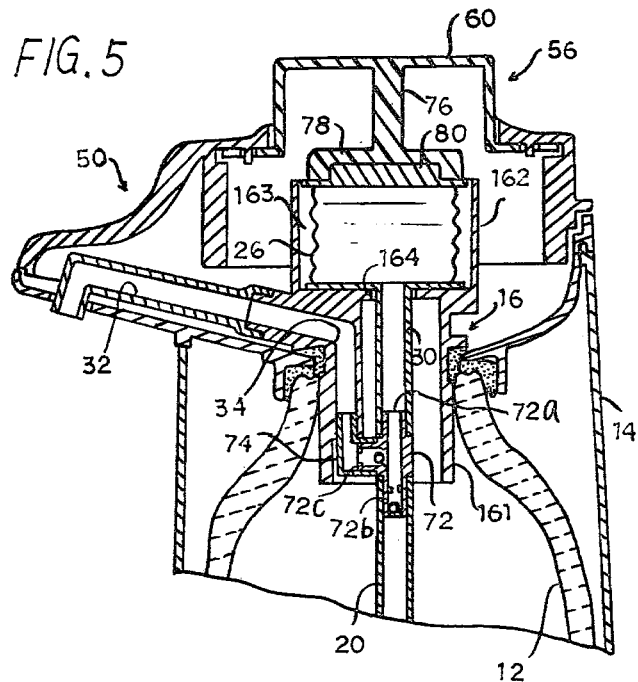
FIG. 5 is a sectional view showing the main part of further embodiment of the present invention, the thermos bottle with device able to drain off water by compression.

Now specifically referring FIG. 5 which shows the other embodiment of the invention, the bottle stopper 16 comprises of a stopper body 161 and an extended section 162 extended from top side of the stopper body 161. The extended section 162 is a chamber 163 opened at its top side for the holding of the elastic pouch 26. There is an aperture 164 between said chamber 163 and the stopper body 161 so as to allow the open extension 30, extended from the bottom base's 28 opening of the elastic pouch 26, to deepen into the stopper body 161 and joints with a three-way fitting or tri-opened connector 72. The said tri-opened connector 72 has its upper opening 72a in spigot joint with the lower end of above said open extension 30, and the lower end and lateral end of the tri-opened connector 72 have the same structure and function as the valve bases 36, 40 in the above described practical example. The said tri-opened connector 72 also has its lower end 72b in joint with a suction pipe 20 and has its lateral end 72c in spigot joint with a socket pipe 74, and the other end of the socket pipe 74, joints the lower end of the forked pipe 34 in the lateral side of stopper body 161.

Furthermore, an axle rod 76 is extended from bottom of the pressed portion 60 of the pressed member 56 and has a mentle 78 at front end for covering over the projection 80 on the top side of the elastic pouch 26 so that it may properly depress the pouch 26 in shrinkage by means of the axle rod 76 while pressing the activator pressed member 56.

Figure 6:
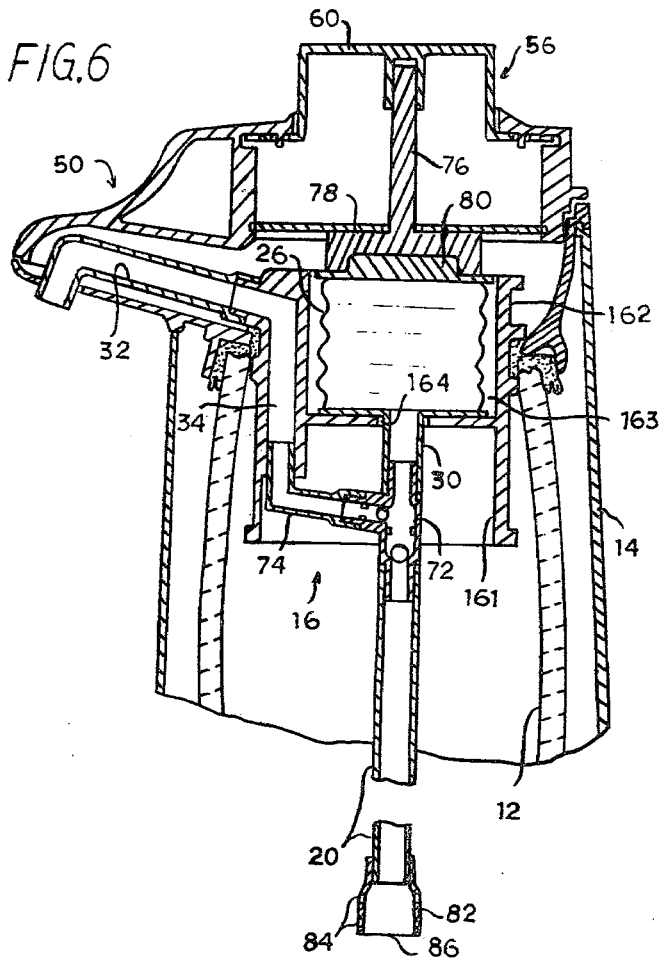
FIG. 6 is a sectional view showing the main part of furthermore embodiment of the present invention.

FIG. 6 is a further embodiment of the invention, in which the inner bottle 12 is a wide mouth bottle able to hold ice cube and the bottle stopper 16 has much the same structure as the example in FIG. 5, including a stopper body 161 and an extended section 162 with a chamber 163 opened at top side. The suction pipe 20 joints with a socket 82 at its end and the socket 82 is provided with lots of eye holes 84 on its wall, in such a construction that ice water stored in the inner bottle 12, while operating the vacuum insulated bottle for the supply of water, may be drained off from the inner bottle 12 through the eye holes 84 or the opening 86 provided on the bottom side of the socket 82 and then through the suction pipe 20 and outlet tube 32. The function of the eye holes 84 is to prevent from losing the function of supplying water resulted from the opening 86 of the socket 82 being blocked.

I claim:

1. A vacuum insulated bottle including a liquid dispensing device comprising in combination:
   a. an outer bottle body;
   b. an inner bottle body disposed within said outer bottle body with said inner and outer bottle bodies each having an outlet at the respective upper end thereof;
   c. a stopper member disposed in the outlet of said inner bottle body in sealing relationship thereat, said stopper member having formed therein a generally vertically extending central duct means with a laterally extending branch passage extending upwardly at a slight inclination to the horizontal to the periphery of said stopper member, said central duct means and said laterally extending passage each having a valve seat adjacent the respective lower ends thereof and a valve element cooperating with each of said valve seats;
   d. an elastic pouch disposed above said stopper member with an opening tightly coupled with the upper end of said central duct;
   e. a lid disposed adjacent the top side of said outer bottle body adapted to be selectively lifted from and lowered to closed position, said lid including a downwardly extending cylindrical case with at least one generally vertically extending bar on the inner wall thereof, said bar having an upper edge or abutment, said lid also having at least one shaft element projecting downwardly for a short distance from the under side thereof, said lid further having an opening at its top;
   f. an activator member including a generally horizontally extending base in pressing contact with the upper end of said elastic pouch and a press portion extending through said opening at the top of said lid, said base having at least one slotted hole therein and a lateral flange with an outwardly opening groove;
   g. a suction pipe disposed within said inner bottle and having an upper end connected to the lower end of the central duct of said stopper member; and
   h. an outlet tube having a lower end connected with the fork or branch passage in said stopper member;

wherein said outwardly opening groove of said lateral flange is registrable with said bar so as to be guided in vertical movement when said bar is disposed therein to thereby pump liquid from said inner bottle body, up said suction pipe, through said stopper member, into said elastic pouch, out said outlet tube by compressing said elastic pouch and allowing it to expand, said lateral flange may be raised above the upper edge of said bar at which height the downwardly projecting shaft element will penetrate the slotted hole in the lateral flange and the actuator member may be rotated to the extent that at least one portion of the lateral flange on one side of the outwardly opening groove will be above the upper edge or abutment of said bar and be locked against pumping action, with said downwardly projecting shaft element being operative to limit rotation of said activator to and from registration of said groove and said bar.

2. The bottle construction as defined in claim 1 wherein said central duct means and said laterally extending passage are each provided with stop plates for limiting movement of said valve elements away from the respective valve seats therein and wherein said valve elements are of the ball type.

3. The bottle construction as defined in claim 1 wherein said suction pipe includes an enlarged diameter portion attached to its lower end and said enlarged diameter portion is opened at its lower end and includes a plurality of holes on its side wall.

4. The bottle construction as defined in claim 1 wherein said central duct means includes a three-way fitting with a portion generally vertically incorporated in said central duct means and a portion as said laterally extending passage.

* * * * *